D. Fasig,
Hay Knife,
N° 58,237. Patented Sep. 25, 1866.

Witnesses:

Inventor:
Daniel Fasig
Per Munn & Co
Attorneys

UNITED STATES PATENT OFFICE.

DANIEL FASIG, OF ROWSBURG, OHIO.

IMPROVEMENT IN STRAW AND HAY KNIVES.

Specification forming part of Letters Patent No. 58,237, dated September 25, 1866.

*To all whom it may concern:*

Be it known that I, DANIEL FASIG, of Rowsburg, Ashland county, State of Ohio, have invented a new and Improved Hay and Straw Knife; and I do hereby declare that the following is a full, clear, and exact description thereof, which will enable others skilled in the art to make and use the same, reference being had to the accompanying drawings, forming part of this specification, in which—

Figure 1:
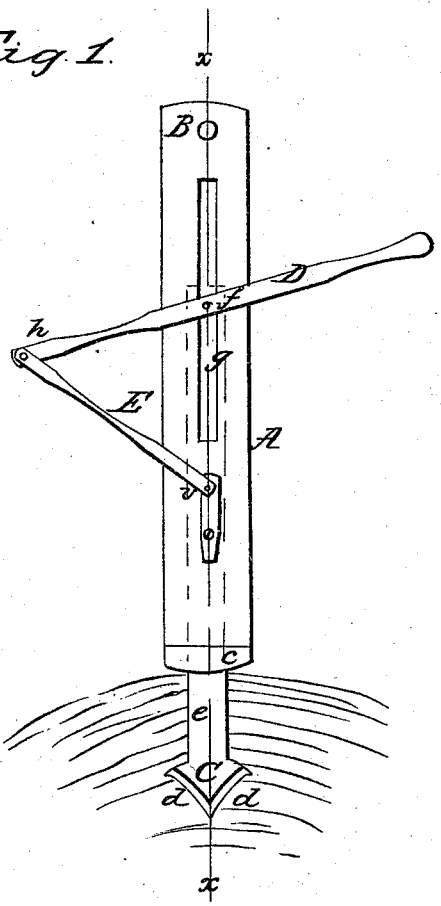
Figure 2:
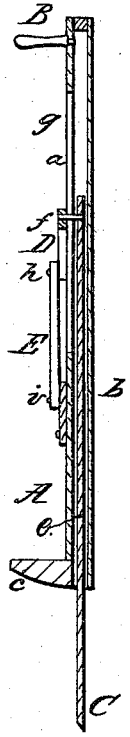

Figure 1 is an elevation of my invention applied to its ———; Fig. 2, a vertical section of the same, taken in the line $x$ $x$, Fig. 1.

Similar letters of reference indicate like parts.

This invention relates to a new and improved knife or cutting device for cutting hay and straw from the stack, and is designed as an improvement over the angular knives now in use for such purpose.

A represents what may be termed the stock of the device, which is constructed of a piece of wood of suitable dimensions, having a groove, $a$, made in it longitudinally at one side and extending its whole length, said groove being covered at one side with a piece of sheet metal, $b$.

The stock A has a handle, B, projecting from it near its upper end at right angles, and the lower end of the stock is formed with a projection, $c$, which rests upon the hay or straw when the knife or cutter is forced into the latter.

C is the knife or cutter, constructed of pointed form and with double cutting-edges $d$ $d$, the rear or upper ends of said edges being curved outward, as shown clearly in Fig. 1. This knife or cutter is formed with a tang, $e$, of rectangular form, which is fitted in the stock so as to slide freely, and it has a pin, $f$, attached, which projects through a longitudinal slot, $g$, in the stock A, said pin $f$ passing through a lever, D, one end of which is connected by a pin, $h$, to an arm, E, attached by a pin, $i$, to the stock.

By operating this lever D the knife or cutter C is actuated, the latter being shoved out from or drawn toward the stock; and in using the device it is held or steadied by the handle B, while the knife or cutter is forced into the hay or straw by actuating the lever D with the foot. A good leverage power is obtained both to force the knife or cutter into the hay or straw or draw it out therefrom, and said lever also serves to keep the loose hay or straw from becoming entangled in using the device.

This invention has been practically tested and has been found to operate well, requiring but a moderate application of power, and capable of being manipulated with facility.

Having thus described my invention, I claim as new and desire to secure by Letters Patent—

A cutting device for cutting hay or straw from the stack A, having the tang $e$ of the knife or cutter C fitted in it and operated by a lever, D, all constructed and arranged substantially as herein shown and described.

DANIEL FASIG.

Witnesses:
JOHN R. WALLACE,
A. A. HAMILTON.